June 10, 1952  J. H. HOLMES  2,599,634
TRACTION ASSIST APPLIANCE
Filed Oct. 2, 1948
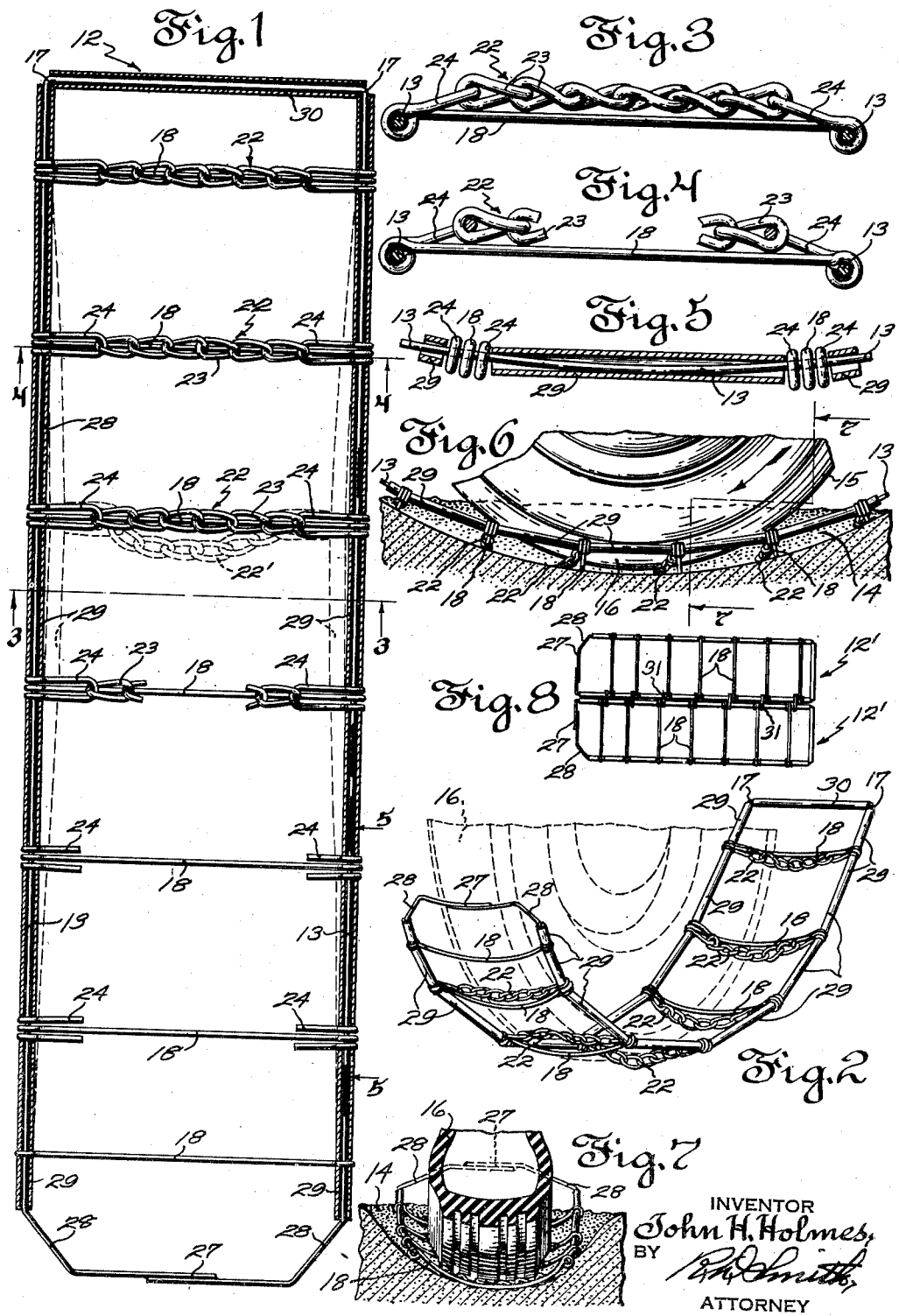
INVENTOR
John H. Holmes,
BY
ATTORNEY Patented June 10, 1952

2,599,634

UNITED STATES PATENT OFFICE 2,599,634

TRACTION ASSIST APPLIANCE

John H. Holmes, Bridgeport, Conn.

Application October 2, 1948, Serial No. 52,450

14 Claims. (Cl. 238—14)

This invention relates to an emergency appliance in the nature of a skeleton mat for road beds adapted to afford traction to the tire of a vehicular wheel when mired in a slippery road hollow or otherwise disenabled to propel a vehicle. The need for such appliances is universally understood by autoists who are aware that free slipping of one driving wheel deprives the other driving wheel of engine power in the conventional differential drive mechanism of an automobile.

I am aware that portable mat like devices have been proposed to be laid between an auto wheel and the roadbed in attempts to improve traction and prevent the slipping of a mired driving wheel, but so far as I am informed such devices have been constructed on the theory that they should be rigid or composed of hinged together rigid sections, and that if flexible, such devices should be composed either of chains, or link fabrics rigidly stretched or not stretched at all and in all cases incapable of restoring themselves to a predetermined original relationship and shape.

An object of this invention is to provide a traction-giving appliance for emergency use which can be interposed between the tire of a vehicular wheel and a concave hollow in a roadbed so constructed that the appliance while normally planar will spring to a dished shape sufficiently to somewhat cradle the wheel while in the main conforming with and clinging to the concave surface of the road hollow. In this way the appliance in its traction giving function becomes in effect an anti-skid unit more or less embedded in the surface of the roadbed rather than a loose mat capable of collapsing or becoming dragged around and flung aside by the turning of the vehicle wheel.

A further object is to provide a non-collapsible portable emergency unit of a resilient nature which will not, when sprung down into a road hollow by the weight of a vehicle wheel, become permanently deformed but which will always tend to resume its planar shape and will do so when relieved of the vehicle weight. Dependable traction-giving performance will thus result at each repeated use of the appliance under a wide variety of slippery or rutted road conditions.

A specific object of the invention is to make use of chain links as a part of the traction affording structure of my improved appliance but so to correlate such chain links to a resiliently yielding portion of the structure that the chains will be stretched in the normal planar shape of the appliance but will become slack when the appliance becomes sprung to a dished shape.

A further object is so to construct an appliance for the purposes indicated that it shall be extremely light in weight and low in cost to manufacture as well as convenient to handle and very durable in use.

A specific object is to so construct my improved skeleton mat that it can easily be placed on the ground in a position to be dragged under the tire of the wheel by mere turning of the wheel under engine power and without being ejected from under the wheel by continued turning of the wheel before it has provided the traction that enables the wheel to climb out of the road hollow.

These and other objects of the invention will appear in further detail from the following description of one successful embodiment of the present improvements, which description refers to the accompanying drawings, wherein:

Fig. 1 is a plan view of my improved skeleton mat unit showing parts thereof broken away and other parts in section.

Fig. 2 is a perspective view of the appliance of Fig. 1 in the dished shape to which it may be sprung by the weight of a vehicle wheel in a road hollow.

Fig. 3 is a view taken in section on the plane 3—3 in Fig. 1 looking in the direction of the arrows, scale enlarged.

Fig. 4 is a view taken on the plane 4—4 in Fig. 1 looking in the direction of the arrows with cross chain incomplete.

Fig. 5 is a fragmentary view taken on the plane 5—5 in Fig. 1 showing freedom of the side rails of the frame to bow in a smooth arc despite their tubular sleeves.

Fig. 6 is a fragmentary side view of a portion of the appliance pinioned between tire and roadbed and thereby sprung to dished curvature like that in Fig. 2.

Fig. 7 is a view taken in section on the planes 7—7 in Fig. 6 looking in the direction of the arrows.

Fig. 8 is a diagram showing on a reduced scale two units mainly like that of Fig. 1 pivotally coupled foldably together by hinge rings.

In the form herein shown for illustrative purposes, my improved appliance comprises a portable normally planar elongated mat-like skeleton frame designated 12 as a whole. This frame includes side rails 13 that are continuous throughout the length of the frame, each of which side rails is sufficiently resilient and yielding to enable the frame as a whole to bow downward in a road hollow 14 along the path of wheel travel as shown in Figs. 2 and 6. Nevertheless each of side rails 13 is sufficiently unbending responsively to the weight of a vehicle whose wheel tire 16 is mired in a concave road hollow 14 as shown in Fig. 6, so that frame 12 strongly resists being sprung or bowed along the path of wheel travel to an arc of curvature as acute as the rolling circumference of the wheel tire 16. In practice side rails 13 may advantageously be provided by a continuous run of resilient wire bent at two corners 17 to form a U-shape in which shape the stretches of the wire which form the legs of the U constitute said side rails.

Connecting the rails 13 there is a series of spaced apart cross ribs or tie struts 18 comprising resilient metallic strips which may be of springy wire of the kind that constitutes side rails 13. Tie struts 18 are disposed crosswise the frame 12 like rungs of a ladder and are anchored pivotally at their ends to the side rails 13, respectively. These tie struts have each of their ends looped freely around the wire of side rails 13 as a means of anchoring them pivotally thereto. Each tie rod or strut 18 is sufficiently resilient and yielding to enable frame 12 to dish downward in the road hollow 14 in a direction crosswise the rolling path of tire 16 responsively to vehicular weight, and yet is sufficiently unbending responsively to such weight to strongly resist bowing of frame 12 in said crosswise direction to an arc of curvature as acute as the profile contour of the wheel tire shown in Fig. 7.

As a result of these new principles of construction, the appliance frame will spring out of its normal planar alignment and into a dished shape that brings it into substantially all-over clinging conformity and partially embedded relation to the concave surface of the road hollow. Thus, as is shown in Fig. 2, the frame 13 when lying between the wheel and the road hollow is bowed both along and also crosswise the direction of wheel travel, so that it cradles the wheel tire. Nevertheless the side rails 13 and tie struts 18 are sufficiently resilient to restore the frame automatically to its normal planar shape when relieved of the weight of the wheel.

In addition to the struts or tie rods 18 there are cross chains 22 composed of traction giving or anti-skid links 23. The end links, or coupling links, 24 of each chain are specially shaped to straddle one end of the tie rod and are looped loosely about the side rails 13 so as to hinge freely thereon. The cross chains 22 are approximately taut when the distance between side rails 13 is at a maximum but become slack and displaceable from alignment with the tie rods when the latter spring to a bowed curvature 22' as indicated by broken lines in Fig. 1 and as shown in Figs. 2, 6, and 7. The looseness or slack in the cross chains becomes greater with each increase of the degree of bowing of the tie rods and is therefore apt to be greater directly under the tire tread. The broken lines in Fig. 1 show the side rails 13 sprung toward each other by the bowing of the tie struts 18 causing the slack in the cross chains referred to. The continuous run of resilient wire forming side rails 13 may be extended to comprise a complete loop by having its free ends fixed together, as by welding, at 27. The end of the loop thus formed is preferably narrowed by converging bends 28 in said wire. This facilitates initial insertion of this end of the appliance into the road hollow so it can be wedged between the wheel tire and the road surface.

While the principles of this invention might be embodied merely in that much of the illustrated structure already described, there remains a need to maintain each tie strut and its cross chain spaced apart from the neighboring tie struts and cross chains. While this might be done by merely providing the wire of side rails 13 with thrust projections to prevent sliding therealong of the anchored ends of the tie struts and cross chains, I have herein shown rigid spacer tubes 29 loosely sleeving the wire of side rails 13. Fig. 5 shows the freedom for continuous bowing permitted to the rail wire within these tubular sleeves. The spacer tubes 29 are in end-to-end relation both along the side rails and also in relation to a corresponding tube 30 that encompasses the crosswise extending stretch of frame wire at one end of the frame.

Tubes 30 may also be of springy nature capable of bowing if desired and depending on the diametrical clearance they afford to their contained frame wire they either may or need not serve as mere spacer beads strung upon the wire. If the fit between frame wire and its encompassing tubes is made close enough and if the tubes have walls of sufficient strength, these tubes may be relied upon to preclude excessive degrees of bowing of the wire that would exceed the elastic limit of the wire and thereby disenable the appliance frame to resume its original planar shape.

As a guide to dimensions and proportions of material that I have found successful in practical use, I recommend for ordinary use with passenger automobiles a frame approximately thirty inches long by ten inches wide, which is of easy size to store and carry in the trunk compartment of a pleasure car. Preferably the side rails 13 are separated laterally by a space wider than the roadbed contacting tread of an automobile tire. The side rails 13 may be of round springy steel wire about three sixteenths of an inch in diameter, of hardness, tensile strength, and elastic limit in keeping with the weight of the average vehicle, while spacer tubes 29 may be 4 inches long and generously oversize in relation to the rail wire which they encompass, having say an inside diameter of $\frac{1}{4}''$ and an outside diameter of $\frac{7}{16}''$.

In operation when an automobile wheel becomes mired in soft ground, snow drifts, ice pockets, muddy or sandy road hollows, etc., the narrowed end 27 of the planar appliance is tucked to a wedged position between tire and road bed from the direction toward which the car is desired to travel. By "planar" is meant that in its unsprung condition frame 12 conforms to a flat surface. When this has been done, turning of the wheel under engine power drags the appliance's nose 27 farther in under the tire until the first cross chain 22 meets the tire and becomes forced against the road surface by weight of the turning wheel. Thereupon the wheel begins to climb over the thus grounded cross chain until the tire tread simultaneously comes to rest on the second cross chain. Constant contacting of the tire tread with two cross chains is insured by the flatness of the contact area of tire with ground, the cross chains being only four inches apart.

A rubber tire tread will not slip on the anti-skid links of the cross chains when these chains are automatically given slack by the novel ability of my skeleton mat to spring into dished shape. This slack enables the chain links to "freeze" to the ground surface under pressure of the tire tread. Hence continued turning of the tire will not fling the appliance out from under the tire, the chain ends remaining anchored to the road by the general all-over conformance of the appliance frame in clinging relation to the surface of the road hollow. The wheel tire continues rolling in contact with two cross chains at a time over a distance of more than two feet. This is sufficient travel in most instances to get the wheel out of trouble and advance it to firm traction.

The full advantage of this invention may be made available to dual, side-by-side tires, common on trucks, by hinging together two unit frames 12' mainly like that of Fig. 1, which may conveniently be done by means of loose coupling loops 31 as indicated in Fig. 8. This enables the units to fold over flat, one upon the other, whereupon the folded double unit requires no more area of storage space and is only double the thickness of a single unit.

For road conditions where there is an unusual length of ground that is too soft to afford traction, two or more units like that of Fig. 1 can be linked together in end-to-end relation by hinge loops like 31 thus forming a track of unlimited continuous length possessed of all the traction-giving characteristics of the single unit illustrated.

Since the underlying novel principles of construction disclosed herein may be incorporated in a great variety of shapes and relationships of parts differing from those chosen to illustrate the invention, the appended claims are directed to and intended to cover all substitutes and equivalents for the structures and combinations disclosed that come within the broadest interpretation of the terms used in the claims.

I claim:

1. A portable traction assistive appliance for emergency application between a vehicular wheel and a soft or slippery road hollow, embodying a planar resilient elongate skeleton frame formed by a ladder-like assembly of spaced apart side rails sufficiently stiff to enable the frame to bridge a road hollow without sagging lengthwise therein under its own weight, and transverse tie struts connecting said side rails and extending therebetween at spaced apart locations with sufficient rigidity to brace said side rails apart, all of said side rails and struts being sufficiently flexible in directions enabling said frame to be sprung temporarily into wheel cradling cupped conformity with a road hollow by the weight of a vehicular wheel resting on said tie struts and being sufficiently resilient to restore said frame automatically to its planar shape when relieved of the weight of the wheel.

2. A non-skid emergency appliance for affording traction to a vehicular wheel when mired in a slippery road hollow, embodying a normally planar portable elongate skeleton frame including, resilient side rails each continuous throughout the length of said frame and sufficiently unbending to resist bowing of said side rails to a curvature as acute as the rolling circumference of the tire of a vehicle wheel when subjected to the weight thereof within a road hollow, and resilient tie wires spaced along said frame connecting and spanning the space between said side rails, said tie wires being sufficiently unbending to resist bowing thereof to a curvature as acute as the profile contour of said tire when subjected to the weight thereof in said road hollow, whereby the appliance is enabled to cradle said tire in line with and also crosswise its path of rolling movement while bowed by the weight of said wheel into clinging conformity with the surface of the road hollow substantially throughout the length and width of said frame.

3. A flat portable traction assistive appliance for emergency application between the tire of an automobile wheel and a slippery hollow in a roadbed, embodying a substantially flat mat of skeleton character comprising resilient elements disposed in ladder-like arrangement including, normally straight elongated continuous side rails separated laterally by a space wider than the roadbed contacting tread of an automobile tire and sufficiently flexible to bow under the weight of an automobile wheel into conformity with a hollow in the roadbed while sufficiently resilient to spring back automatically into straightened shape when relieved of said wheel weight, and a series of tie struts spanning said space between said side rails and connecting the latter in a manner tending to maintain said space, said tie struts being normally straight and sufficiently flexible to bow temporarily under weight of said vehicular wheel into curved conformity with said road hollow while sufficiently resilient to spring back automatically into straightened shape when relieved of said wheel weight, whereby said appliance is enabled to cradle and contact a large portion of the surface of the tire tread and road hollow simultaneously for traction assistance and then spring back into a flat condition for space saving storage after its emergency use.

4. A portable traction assistive appliance as defined in claim 3, in which the said tie struts are normally straight and sufficiently flexible to bow temporarily under weight of said vehicular wheel into curved conformity with said road hollow while sufficiently resilient to spring back automatically into straightened shape when relieved of said wheel weight, together with a series of cross chains tautly spanning said space each having its ends anchored respectively to the said resilient side rails in locations closely adjacent said tie struts so that bowing of said struts is necessary to permit the occurrence of slack in said cross chains, whereby said appliance is enabled to spring back and forth between a flat condition for space saving storage and a dished condition in clinging conformity with a roadbed hollow in which dished condition said cross chains are slack.

5. A portable traction assistive appliance for emergency application between the tire of an automobile wheel and a slippery hollow in a roadbed, embodying a substantially flat skeleton structure comprising resilient elements disposed in ladder-like arrangement including, normally straight elongate continuous side rails separated laterally by a space wider than the roadbed contacting tread of an automobile tire and sufficiently flexible to bow under the weight of an automobile wheel into conformity with a hollow in the roadbed in the direction of wheel travel while sufficiently resilient to spring back automatically into straightened shape when relieved of said wheel weight, and a series of normally straight tie struts spanning said space between said side rails and connecting the latter in a manner tending to maintain said space, said tie struts being likewise sufficiently flexible to bow under the weight of an automobile wheel into conformity with said roadbed hollow transversely the direction of wheel travel while sufficiently resilient to spring back automatically into straightened shape when relieved of the wheel weight.

6. An emergency appliance as defined in claim 5, in which the said side rails comprise parallel spaced-apart stretches of a continuous elongated loop of springy wire having its free ends fixed together at one end of said loop.

7. An emergency appliance as defined in claim 5, in which the said side rails comprise parallel spaced-apart stretches of a continuous elongated loop of springy wire having its free ends fixed together at one end of said loop, and having one end of said loop narrowed by converging bends in said wire thereby to facilitate initial insertion of said narrowed loop end between the said vehicular tire and the said road surface.

8. A portable traction assistive appliance as defined in claim 5, in which the said side rails comprise portions of a continuous run of resilient wire bent to form a U-shape border for the said skeleton structure.

9. A portable traction assistive appliance as defined in claim 5, together with a series of normally taut cross chains having their ends anchored respectively to the said side rails in locations closely adjacent the said tie struts whereby bowing of said struts is made necessary to permit the occurrence of slack in said cross chains.

10. In a traction assistive appliance, a ladder-like frame comprising spaced apart side wires, spaced apart cross wires each having its ends looped around said side wires respectively, and cross chains of anti-skid links, each end link of each said chain straddling a looped end of one of said cross wires and being looped about the same side wire as said looped end of said cross wire.

11. A non-skid emergency appliance for affording traction to a vehicular wheel when mired in a slippery road hollow, embodying a normally planar portable elongate skeleton frame including, resilient side rails each continuous throughout the length of said frame and sufficiently unbending to resist bowing of said side rails to a curvature as acute as the rolling circumference of the tire of a vehicle wheel when subjected to the weight thereof within a road hollow, and resilient tie wires spaced along said frame connecting and spanning the space between said side rails, said tie wires being sufficiently unbending to resist bowing thereof to a curvature as acute as the profile contour of said tire when subjected to the weight thereof in said road hollow, whereby the appliance is enabled to cradle said tire in line with and also crosswise its path of rolling movement while bowed by the weight of said wheel into clinging conformity with the surface of the road hollow substantially throughout the length and width of said frame, together with tubes loosely sleeving said side rails between said tie wires.

12. A non-skid emergency appliance as defined in claim 11, in which each of the said tubes is long enough to reach from one to another of the said tie wires thereby to determine and maintain the spacing apart of the latter.

13. A non-skid emergency appliance as defined in claim 11, in which each of the said wires is round and each of the said tubes has a hole occupied by the said side wire sufficiently larger than the side wire to permit the latter to bow to a limited degree without resistive interference by the tube that surrounds it.

14. A non-skid emergency appliance for giving traction to a vehicular wheel when mired in a slippery road hollow, comprising an elongated ladder-like portable springy skeleton frame including a continuous run of resilient wire bent to form a U-shape border for said frame having spaced apart marginal legs composed of said wire, a series of spaced apart tie struts comprising resilient metallic wires disposed crosswise said frame like rungs of a ladder and anchored at their ends to said legs respectively, and stiff tubular sleeves respectively encompassing said legs and at least one of said tie struts, said sleeves being oversize in relation to the wire of said legs and strut and disposed end-to-end.

JOHN H. HOLMES.

REFERENCES CITED

The following references are of record in the file of this patent:

UNITED STATES PATENTS

| Number | Name | Date |
|---|---|---|
| 1,430,471 | Simon | Sept. 26, 1922 |
| 1,620,377 | Millward | Mar. 8, 1927 |
| 2,248,537 | Libbey | July 8, 1941 |